United States Patent [19]
Tokuyama et al.

[11] Patent Number: 6,025,974
[45] Date of Patent: Feb. 15, 2000

[54] MAGNETIC HEAD SLIDER ASSEMBLY FOR MAGNETIC DISK RECORDING/REPRODUCING APPARATUS

[75] Inventors: Mikio Tokuyama, Tsukuba; Teruyoshi Higashiya, Odawara; Yoshinori Takeuchi, Ishioka; Sadanori Nagaike, Odawara; Kazuo Nate, Machida; Tetsuji Higashijima, Odawara; Shinsuke Higuchi, Odawara; Shigeo Nakamura, Odawara; Kenji Mori, Hadano, all of Japan

[73] Assignee: Hitachi, Ltd., Tokyo, Japan

[21] Appl. No.: 09/247,566

[22] Filed: Feb. 10, 1999

Related U.S. Application Data

[63] Continuation of application No. 08/529,803, Sep. 18, 1995, Pat. No. 5,886,856.

[30] Foreign Application Priority Data

Sep. 19, 1994 [JP] Japan ................................ 6-222937
Mar. 1, 1995 [JP] Japan ................................ 7-041585

[51] Int. Cl.⁷ .................................................... G11B 17/32
[52] U.S. Cl. ............................................................. 360/103
[58] Field of Search ...................................... 360/103–104

[56] References Cited

U.S. PATENT DOCUMENTS 5,886,856  3/1999  Etal .......................................... 360/103

FOREIGN PATENT DOCUMENTS

| 5-174351 | 7/1993 | Japan . |
| 6-36488 | 2/1994 | Japan . |
| 6-52645 | 2/1994 | Japan . |
| 6-68632 | 3/1994 | Japan . |

*Primary Examiner*—Allen T. Cao
*Attorney, Agent, or Firm*—Beall Law Offices

[57] ABSTRACT

A magnetic head slider assembly for a magnetic disk type recording/reproducing apparatus includes a slider body, a sliding pad provided on the slider body and projecting beyond a disk facing surface thereof, a thin film layer disposed at one end of the slider body, a magnetic head constituted by the thin film layer as an integral part thereof, and a core pad projection incorporating therein a core of the magnetic head and projecting beyond an adjacent disk facing surface of the slider body. The sliding pad is provided at a region of the slider body ahead of the core pad projection and prevents generation of a floating force by making use of a relative movement between the slider body and the magnetic disk. The core pad projection is not formed as a continuation of the slider body and is separated from the sliding pad a predetermined distance longitudinally of the slider body by a recess interposed therebetween whereby the core pad projection is positioned closer to the magnetic disk than a back end of the sliding pad.

4 Claims, 14 Drawing Sheets

ROTATING DIRECTION OF DISK

WIDTHWISE DIRECTION

ROTATING DIRECTION OF DISK

ROTATING DIRECTION OF DISK

MAGNETIC HEAD SLIDER ASSEMBLY FOR MAGNETIC DISK RECORDING/REPRODUCING APPARATUS

This is a continuation application of U.S. Ser. No. 08/529,803, filed Sep. 18, 1995, now U.S. Pat. No. 5,886,856.

BACKGROUND OF THE INVENTION

The present invention relates generally to a magnetic head slider assembly for a magnetic disk recording/reproducing apparatus. More particularly, the invention is concerned with a magnetic head slider assembly which is profitably suited for realizing a high density recording with a small gap (floating height) between a magnetic head and a magnetic disk or with a contact recording. Furthermore, the invention is also concerned with a method of manufacturing the magnetic head slider assembly and a magnetic disk recording/ reproducing apparatus incorporating the same.

As the magnetic head slider assembly of the type mentioned above, there is known a structure in which pads are provided on a surface of a magnetic head slider assembly. By way of example, there is disclosed in JP-A-6-36488 such a structure of the magnetic head slider assembly in which a pair of pads or rails (referred to as a floating surface (3) in the above publication) are provided on a slider body for generating a floating force. This floating surface (3) is so formed as to cover continuously a magnetic transducer and a thin film layer provided at a rear end portion of the floating surface (3). On the other hand, an aerodynamic supporting type magnetic head slider assembly is disclosed in JP-A-6-52645, which assembly is provided with a pair of pads disposed at opposite sides, respectively, and a pad disposed at a rear end portion, wherein these pads are partitioned or delimited by recesses or spaces with a view to reducing the size and the weight of implementing the magnetic head slider assembly as a whole. Of these pads, the one provided at the rear end portion of the magnetic head slider assembly is so formed as to present a continuous surface which covers the slider body, a magnetic transducer (magnetic head) and a thin film and formed of a same material as the main body of a slider. For more particulars, reference should be made to JP-A-6-52645, column 6, lines 15 to 21 and 24 to 27.

Furthermore, in the case of the magnetic head slider assembly disclosed in JP-A-6-68632, such a side rail structure is adopted which includes protrusions (51) and (52) disposed adjacent to the thin film head and elongated rail portions disposed at a leading or entrance side of the magnetic head slider assembly as viewed in the direction in which a magnetic medium is moved or rotated relative to the magnetic head slider assembly with a view to protecting the top surface of the side rails from injury, wherein the elongated rail portions are isolated from the protrusions (51) and (52) by an interposed groove. The protrusions (51) and (52) are formed of a same material as that of the slider body of the magnetic head slider assembly. For more particulars, reference should be made to JP-A-6-68632, column 3, lines 21 to 24 and 45 to 49.

FIG. 13 is a perspective view of a conventional magnetic head slider assembly known heretofore, FIG. 14 is a view for illustrating conceptually a floating state of the conventional magnetic head slider assembly, and FIG. 15 is an fragmentary elongated view of FIG. 14 showing a portion D indicated as encircled therein. In these figures, reference numeral 200 denotes generally the conventional magnetic head slider assembly, 210 denotes a slider body, 220 denotes a magnetic transducer or head, 211 denotes floating pads, and 223 denote cores of the magnetic transducers 220. Referring to the figures, in the conventional magnetic head slider assembly 200, floating pads generally denoted by 230 are polished in order to finish smoothly the floating surfaces thereof. In this conjunction, it is noted that the floating pad 211 provided in the slider body 210 and the floating pad 231 provided on the magnetic transducer 220 (including a thin film thereof) differ from each other in respect to the hardness of the materials forming these pads. Consequently, when the floating pads 230 undergo machining for polishing, a height offset Hd will make appearance between the floating pads 211 and 231 due to the difference in hardness of the materials (refer to FIG. 15). This height offset Hd will hereinafter be referred to as the process offset. The reason why such process offset makes appearance can be explained by the fact that the floating pad 231 provided on the magnetic transducer 220 is formed of a soft material as compared with the floating pad 211 of the slider body 210 and thus removed away at a higher rate than the latter upon polishing. Such being the circumstances, the process offset Hd is inevitably produced in the pad of the slider body regardless of whether the pad is to serve for generation of the floating force or as the floating surface or the protrusions disposed closer to the thin film head element.

By the way, it is required to reduce the floating height of the magnetic head slider assembly relative to the magnetic disk to a possible minimum in order to realize a high recording density.

In this conjunction, it is noted that when the floating height is decreased, as mentioned above, the floating height Hs of the floating pad provided on the slider body becomes lower than the floating height Hm of a core element 223 of the magnetic head because of the presence of the process offset.

For the reasons mentioned above, when the floating height is further decreased, there may arise such unwanted situation that the pad of the slider body contacts with the magnetic disk before the core (element) of the magnetic transducer (magnetic head) is brought into contact with the surface of the magnetic disk. More specifically, in the case of the prior art magnetic head slider assembly, the floating pad 231 of the magnetic head is provided in continuation or bonding to the pad 211 of the slider body 210, as described above. As a consequence of this, an end surface of the floating pad 211 of the slider body 210 comes to contact with the magnetic disk surface 5 (FIGS. 14 and 15) in precedence to the floating pad 231 of the magnetic head portion. Accordingly, it is impossible to decrease the floating height more than the process offset Hd. Besides, because no physical contact can essentially be realized between the magnetic transducer or head and the magnetic disk, the contact recording is rendered impossible. Such problem equally arises when the contact recording is to be performed with the magnetic head being contacted to the magnetic disk during rotation thereof. It will now be understood that the process offset provides a great obstacle to realization of a high density recording.

SUMMARY OF THE INVENTION

In the light of the state of the art described above, it is an object of the present invention to provide a magnetic head slider assembly which can avoid the influence of a process offset as well as a method of manufacturing the same.

Another object of the present invention is to provide a magnetic disk recording/reproducing apparatus which is capable of performing a high-density recording by decreasing the floating height of a magnetic head slider assembly or solving the problem presenting an obstacle to a contact recording by essentially nullifying the influence of the process offset.

Yet another object of the present invention is to provide a magnetic head slider assembly of a novel and improved structure having only a projecting portion which incorporates therein cores of a magnetic head formed in a thin film of a main body of the slider as well as a method of manufacturing the magnetic head slider assembly.

In view of the above and other objects which will become more apparent as the description proceeds, the present invention is directed to a magnetic head slider assembly which includes a slider body and a magnetic head (also referred to as the magnetic transducer) formed in a thin film layer provided at one side of the slider main body, wherein a floating rail or a pad adapted to contact with a surface of a magnetic disk is provided in the slider body in the form of projection(s) or protrusion(s) extending in the direction from a bleeder surface of the slider body toward a surface of a magnetic disk for which recording/reproducing operation is to be performed by means of the magnetic head slider assembly.

According to a general aspect of the present invention, there is provided a magnetic head slider assembly which includes a projection incorporating or embedding therein magnetic cores of a magnetic head formed in a thin film structure and projecting in the direction facing a surface of a magnetic disk on which recording/reproducing operation is to be performed. For convenience sake of the description, the above-mentioned projection will be referred to as the core pad projection. This core pad projection including the cores of the magnetic head is formed independently in a predetermined region of the thin film layer. In this conjunction, it is to be noted that with the expression to the effect that the core pad projection is provided independently and projects toward the magnetic disk means that the core pad projections does not extend continuously to projections or pads which may be provided on the slider body. Accordingly, in the magnetic disk recording/reproducing apparatus provided with the magnetic head slider assembly according to the invention, the bleeder surface of the slider body which faces in opposition to a surface of the magnetic disk is so positioned as to be retracted in the direction away from the disk surface by a distance corresponding to the height of the core pad projection.

The magnetic head slider assembly according to the present invention may be manufactured by fabricating the magnetic head with the thin film layer on a substrate which is to constitute the slider body. Among others, the core pad projection(s) may be implemented by forming an etching mask at a predetermined location where the magnetic head is to be formed, whereon materials are removed by a suitable process, e.g. ion etching process in the regions which are not covered with the etching mask to thereby form the core pad projection(s).

According to the teachings of the present invention, the core pad projection of the magnetic head is positioned closer to the magnetic disk than the projections such as pad(s) formed in the slider body or alternatively in contact with the magnetic disk upon recording/reproducing operation. Thus, even when a manufacturing offset exists between the pad provided on the slider body and the core pad projection of the magnetic head, the magnetic head slider assembly can stably float above the magnetic disk at a predetermined angle of incidence or stably be placed to contact with the magnetic disk. Furthermore, by spacing the pad formed on the slider body from the core pad projection of the magnetic head for a predetermined distance, the floating height of the core pad projection of the magnetic head can be decreased to a possible minimum which is smaller than the manufacturing offset. In other words, the floating height of the magnetic head can be reduced shorter than that of the so-called process offset. Additionally, a contact recording in the intrinsic sense can be achieved.

Thus, according to the teachings of the present invention, obstacle to realization of a lowest floating height due to the process offset resulting from polishing of the floating surface can substantially be nullified.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
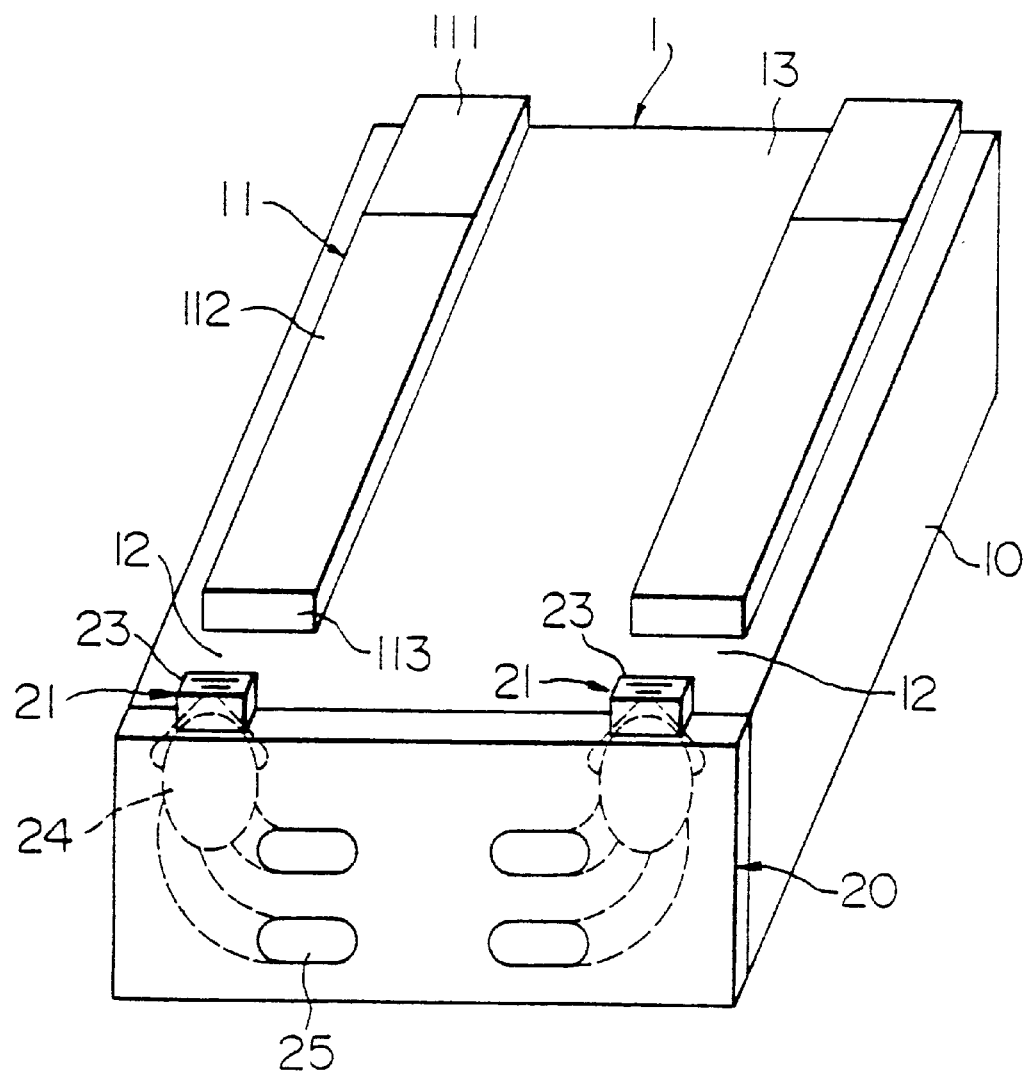
FIG. 1 is a perspective view showing schematically a structure of a magnetic head slider assembly according to a first embodiment of the present invention.

Now, the present invention will be described in detail in conjunction with what is presently considered as preferred or typical embodiments thereof by reference to the drawings. In the following description, like reference characters designate same or like parts throughout the several views. Also in the following description, it is to be understood that such terms as "left", "right", "upper", "lower", "rear", "front", "widthwise", "transversal" and the like are words of convenience and are not to be construed as limiting terms.

Embodiment 1

Figure 16:
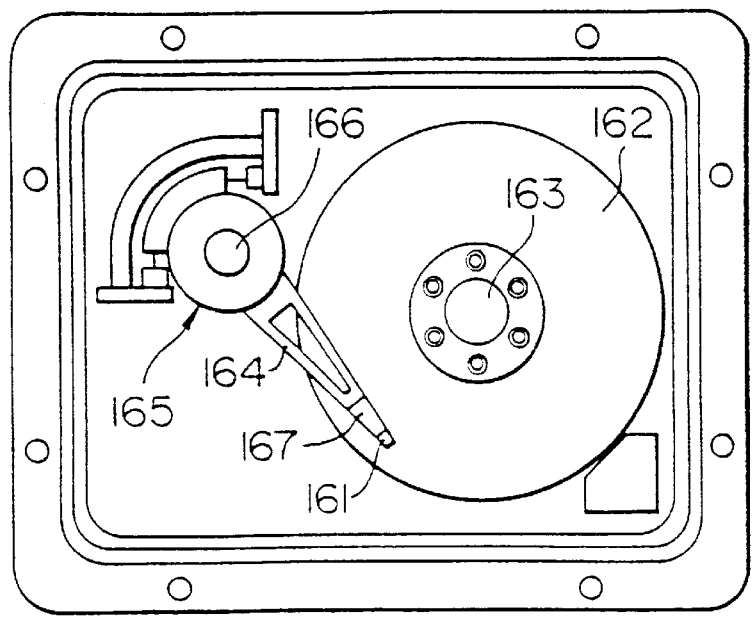
FIG. 16 shows in a plan view an outer appearance of a magnetic disk recording/reproducing apparatus to which a magnetic head slider assembly according to the invention can profitably find application.

A magnetic head slider assembly according to a first embodiment of the invention will be described by referring to FIGS. 1 and 16, in which FIG. 1 shows the same in a perspective view and FIG. 16 shows an outer appearance of a magnetic disk recording/reproducing apparatus equipped with the magnetic head slider assembly according to the invention. In this conjunction, it should be mentioned that the magnetic disk recording/reproducing apparatus is implemented intrinsically in a substantially hermetically sealed structure and provided with a cover which is however omitted from illustration in FIG. 16. First referring to FIG. 16, a magnetic disk 162 is mounted on a spindle 163 which is rotated at a predetermined number of rotations (rpm) by means of a driving motor (not shown). A magnetic head slider assembly 161 is fixedly secured to a lever 167 which is mounted on an arm 164 which in turn is operatively coupled to an actuator 165. The arm 164 is adapted to be driven swingably or pivotally around a spindle 166 by means of the actuator 165 so as to be indexed to desired positions on the magnetic disk 162.

A structure of a floating type magnetic head slider assembly is shown in FIG. 1. Referring to this figure, a magnetic head slider assembly denoted generally by a reference numeral 1 is comprised of a magnetic head or magnetic transducer 20 realized in a thin film layer provided at a rear end portion of the slider body 10 as viewed in the direction in which the magnetic disk (162 in FIG. 16 and 5 in other figures) is rotated. The slider body is provided with a pair of floating pads 11 which protrude from a slider portion of the slider body 10. The thin film magnetic head 20 includes a core (also referred to as the element) 23 having an upper core element 23a and a lower core element 23b. A pair of pads 21 each including the magnetic head core 23 of the thin film magnetic head 20 protrude beyond the bleeder surface 13 of the slider body 10 in the direction facing the magnetic disk surface (i.e., in the direction in which the magnetic head slider assembly is caused to float). These pads 21 will hereinafter be referred to as the core pad projections.

Each of the floating pads 11 is in the form of an elongated rectangular rail which is provided with a tapered portion 111 and a flat portion 112. Further, each of the floating pads 11 is terminated at an end face 113 without being formed in continuation to the core pad projection 21 but formed independently, being distanced from the core pad projection 21 by a predetermined distance $\underline{\ell}$ in the direction toward the front edge of the slider body, i.e., toward the tapered portion 111. To say in another way, there exists a space 12 between the core pad projection 21 provided in association with the thin film magnetic head 20 and the end face 113 of the floating pad 11 provided on the slider body 10. The bottom of the space 12 is flush with the surface of the bleeder portion 13. More specifically, although the core pad projection 21 and the floating pads (rails) 11 are so formed as to project beyond the bottom surface of the bleeder surface 13, they are not structurally continued to each other because of the interposition of the spaces 12 therebetween.

Figure 2:
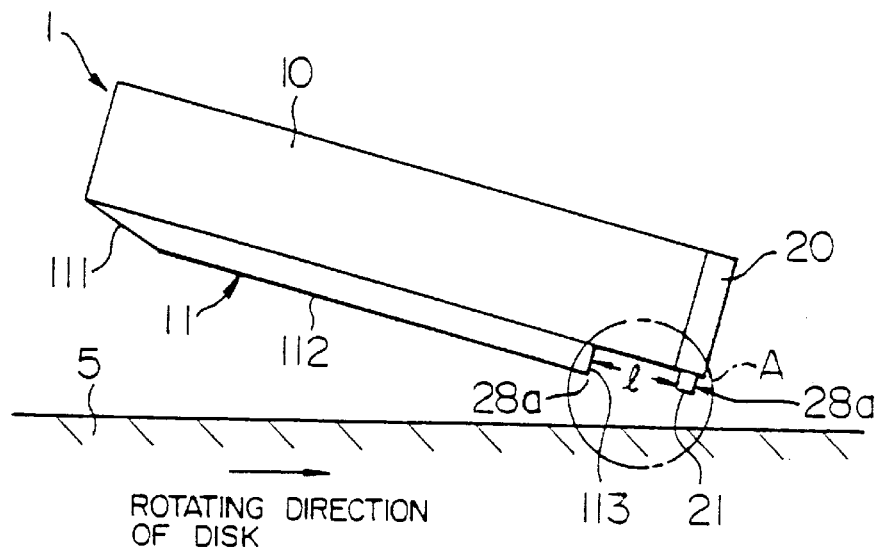
FIG. 2 is a view for illustrating conceptionally a floating mechanism of a magnetic head slider assembly according to the first embodiment of the invention.
Figure 3:
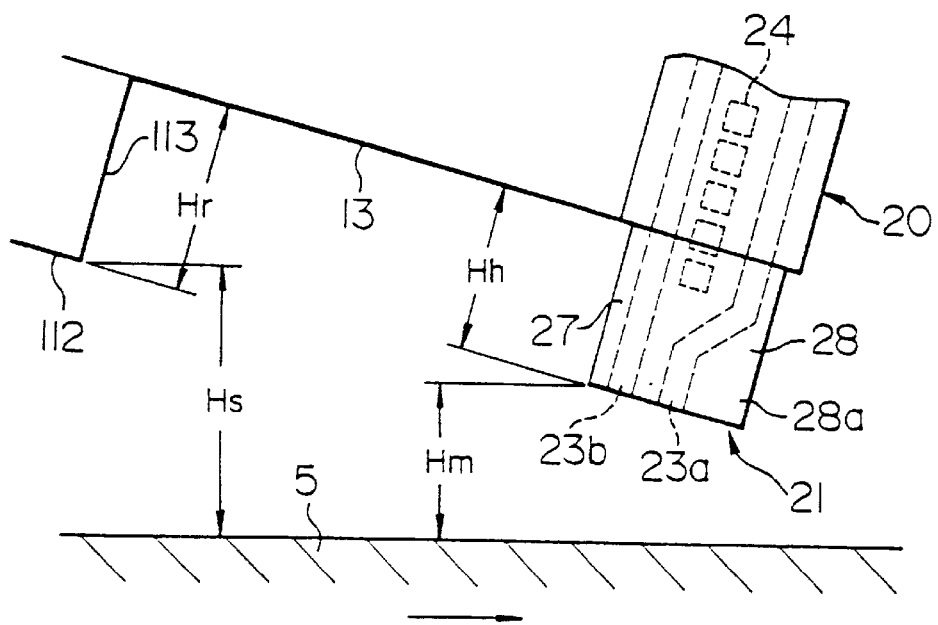
FIG. 3 is a fragmentary enlarged view of a portion of the magnetic head slider assembly shown in FIG. 2 and designated as encircled in the same figure.

As can be seen in FIGS. 2 and 3 in which FIG. 2 is a view for illustrating conceptionally a floating mechanism of the magnetic head slider assembly according to the instant embodiment of the invention and FIG. 3 is a fragmentary enlarged view of a portion designated as encircled in FIG. 2, a height Hh between the bleeder surface 13 of the slider body 10 and the disk facing surface of the core pad projection 21 which faces in opposition to the magnetic disk surface is approximately equal to a height Hr between the bleeder surface 13 and the flat portion 112 of the floating pads 11.

Each of the magnetic heads 20 is composed of a coil 24, a connecting pad 25, a substrate layer 27 and a protective film 28. In the case of the magnetic head slider assembly according to the instant embodiment of the invention, the core pad projection 21 is realized in a rectangular form of a size of about 40 $\mu$m×20 $\mu$m and has a height of about 20 $\mu$m. By implementing the core pad projection 21 as a rectangular piece of the small size as mentioned above, the core pad projection 21 can make substantially no contribution to generation of a floating force. Thus, the floating characteristic of the magnetic head slider assembly is determined essentially by the floating characteristics of the paired floating pads 11. The thickness of the thin film layer 20 of the magnetic head is about 50 $\mu$m in the case of the magnetic head slider assembly according to the instant embodiment of the invention, which presents no difficulty to the provision of the core pad projection 21 of 40 $\mu$m×20 $\mu$m in size. Parenthetically, the slider body of the magnetic head slider assembly according to the instant embodiment of the invention has a length of 2 mm, a width of 1.6 mm and a height of 0.4 mm. It goes however without saying that the size and the form or geometry of the slider body is never limited to those mentioned above. Of course, the size of the core pad projection 21 is never limited to the dimensions of 40 μm×20 μm but may be implemented in any size and form so long as it has a thickness smaller than that of the thin film magnetic head 20 so that the former can be formed within the region of the thin film without departing therefrom. In this conjunction, it should be noted that the magnetic head core 23 of the thin film magnetic head 20 is sandwiched between the substrate layer 27 and the protective film 28, as can be clearly seen from FIG. 3. Thus, there arises no necessity of modifying the shape of the core in an effort to make it conform with the geometry of the core pad projection 21.

Furthermore, by selecting the height Hr of the floating pad from the bleeder surface 13 of the slider body to the flat portion 112 of the floating pads 11 to be equal to the height Hh of the core pad projection 21, both heights being 20 μm, as in the case of the instant embodiment of the invention, it is possible to prevent the floating force from being generated at the bleeder surface 13. With the structure of the magnetic head slider assembly now under consideration, desired floating characteristics can be realized by designing correspondingly only the paired floating pads 11.

Referring to FIG. 2, due to the relative movement between the magnetic head slider assembly 1 and the rotating magnetic disk 5, an aerodynamic pressure is produced above the magnetic disk 5 by the floating pads 11, as a result of which the floating pads 11 are caused to float above the magnetic disk 5 with a predetermined angle of incidence because of the provision of the tapered portions 111 at the leading side of the floating pads 11, respectively. Additionally, the end face 113 of each of the floating pads 11 provided in the slider body 10 is located with a predetermined distance or space from the core pad projection 21 toward the leading edge (tapered portion) of the magnetic head slider assembly.

Furthermore, because the distance Hm from the magnetic disk surface to the magnetic head core 23 of the magnetic head slider assembly is shorter than the distance Hs from the magnetic disk surface to the edge 112a of the flat portion 112 of the floating pad 11, the floating height Hm of the magnetic head core 23 can be reduced to a possible minimum.

More specifically, even when the amount of material removed by a polishing process differs between the floating pad 11 and the core pad projection 21 due to difference in hardness thereof, which results in that the height Hh of the core pad projection becomes smaller than the height Hr of the floating pad 11 from the bleeder surface 13 to the floating pad (i.e., even Hr>Hh), the magnetic head slider assembly can assume a floating state with an angle of incidence. Besides, since the end face 113 of the floating pad 11 and the core pad projection 21 are distanced from each other, the magnetic head core 23 of the magnetic head can assume the minimum floating height Hm.

As will now be understood from the foregoing description, with the structure of the magnetic head slider assembly according to the instant embodiment of the invention, the adverse influence of the process offset which has heretofore provided an obstacle to the attempt for decreasing the floating height of the magnetic head slider assembly can essentially be eliminated, making it possible to realize a high density recording with a decreased floating height of the magnetic head slider assembly.

Because the floating pad 11 and the core pad projection 21 are each of a rectangular shape, they can be manufactured by machining. Of course, they can easily be fabricated by ion milling, etching or thin film vapor deposition process as well. The machining process is advantageous in that it is inexpensive, while the ion milling, etching or the thin film vapor deposition process is advantageous in that the floating pad 11 and the core pad projection 21 can be finished arbitrarily and accurately in desired shapes, although the latter requires a lot of time when compared with the former.

It should further be added that the concept of the present invention incarnated in the instant embodiment can effectively be applied to realization of data read/write operation in such state of the magnetic head slider assembly where the floating height of the magnetic head from the magnetic disk surface is further decreased with the floating pad 11 floating without contacting the magnetic disk surface whereas a portion of the core pad projection 21 facing the magnetic disk, i.e., a portion 28a of the protective film 28 is brought into continuous contact with the surface of the magnetic disk 5. By making the core pad projection 21 slide continuously on the disk surface in this manner, the gap between the magnetic layer (not shown) of the magnetic disk and the magnetic head core 23 can be reduced to a possible minimum, whereby the recording density can surprisingly be enhanced.

In this conjunction, the corner portion 28a of the protective film 28 which is brought into contact with the magnetic disk surface may be tapered or chamfered. Then, the magnetic head core 23 and the surface of the magnetic disk 5 can be positioned closer to each other while obviating the damage possibly occurring upon contacting. Thus, the operation reliability of the magnetic head can further be enhanced.

Embodiment 2

Figure 4:
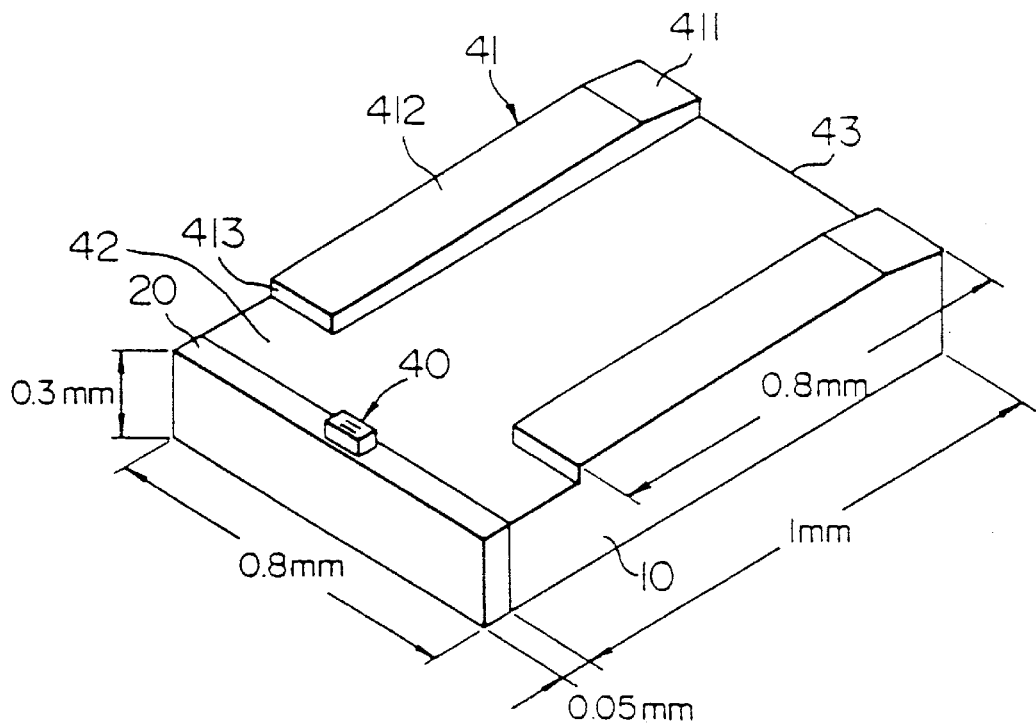
FIG. 4 is a perspective view showing schematically a structure of the magnetic head slider assembly according to a second embodiment of the present invention.

FIG. 4 is a perspective view showing schematically a magnetic head slider assembly according to a second embodiment of the present invention. The magnetic head slider assembly according to the instant embodiment differs from that of the first embodiment in that it has a single core pad projection at a center of the thin film magnetic head 20 as viewed in the direction widthwise of the magnetic head slider assembly.

As in the case of the magnetic head slider assembly according to the first embodiment of the invention, end faces 413 of floating pads 41 are formed as displaced with a predetermined distance from a core pad projection 40 toward the leading side (tapered end) of the slider so that a space 42 intervenes between the end faces 413 of the floating pads and the core pad projection 40. With the structure of the magnetic head slider assembly according to the instant embodiment of the invention, the adverse influence of the so-called process offset providing an obstacle to realization of the lower floating level of the magnetic head slider assembly can successfully be mitigated or eliminated.

In the magnetic head slider assembly according to the instant embodiment of the invention, the slider body 10 has an overall length of 1.0 mm, a width of 0.8 mm and a height of 0.3 mm, wherein the floating pad (41) is 0.8 mm in length (about 80% of the overall length of the slider which is 1.0 mm). The height Hr from a bleeder surface 43 to a floating surface of each of the floating pads 41 and the height Hh of the core pad projection 40 from the surface facing the magnetic disk are each of about 20 μm. Of course, the geometries or dimensions of the slider are not restricted to those mentioned above. However, it is preferred to select the length of the floating pad as measured from the leading edge of the slider to be about 80% of the overall length of the slider. In other words, the end face 413 of the floating pad should preferably be so formed that the end face 413 of the floating pad is distanced away from the core pad projection 40 about 20% of the overall length of the slider, the reason for which will be elucidated below.

Figure 5:
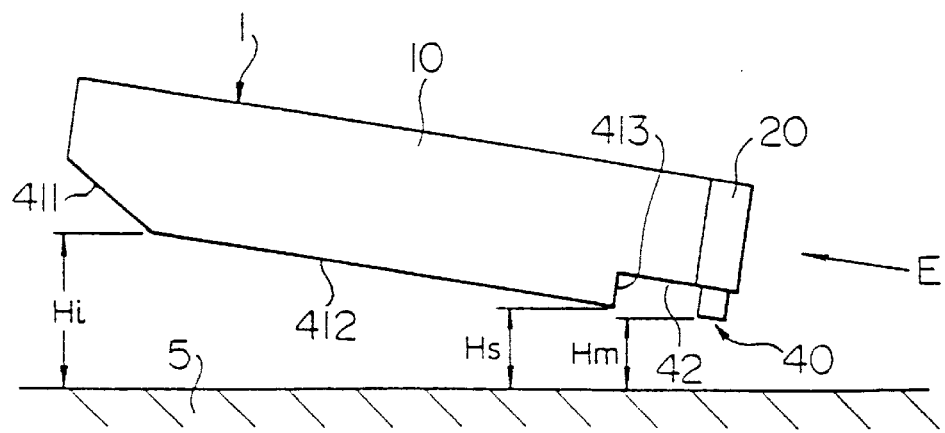
FIG. 5 is a conceptional view for illustrating a floating mechanism of the second embodiment of FIG. 4.

It is now assumed that a difference of 10 nm in height makes appearance between the floating pad 41 and the core pad projection 40 due to a polishing process performed for securing the flatness of the floating surfaces. As is shown in FIG. 5, the floating pad of the magnetic head slider assembly according to the instant embodiment of the invention is composed of a tapered portion 411 and a flat portion 412, wherein the magnetic head slider assembly is so designed that the ratio (Hi/Hm) between the floating height Hm of the core of the magnetic head and the floating height (Hi) of a boundary portion between the tapered portion 411 and the flat portion 412 of the floating pad 41 is about "2". In general, this floating height ratio (Hi/Hm) is referred to as the gap ratio, and in many cases, the slider body is so designed that this ratio assumes a value within a range of "2" to "3". In the case of the magnetic head slider assembly according to the instant embodiment of the invention, it is assumed that the floating height Hm of the core pad projection is 50 nm. In order that the floating height Hm of the core pad portion of the magnetic head is to be smaller than the minimum floating height Hs of the floating pad on the conditions mentioned above, the end face 413 of the floating pad should preferably be provided at a position which is distanced from the leading end or entrance side of the slider body about 80% of the overall length of the slider. For this reason, in the magnetic head slider assembly according to the instant embodiment of the invention, the length of the floating pad is selected to be 0.8 mm. To say in another way, the end face 413 of the floating pad 41 is spaced from the core pad projection 21 by a distance corresponding to about 20% of the overall length of the slider. It is however obvious that the end face 413 of the floating pad may be positioned closer to the core pad projection 40 in case the gap ratio mentioned above is designed to be greater than "2".

Figure 6:
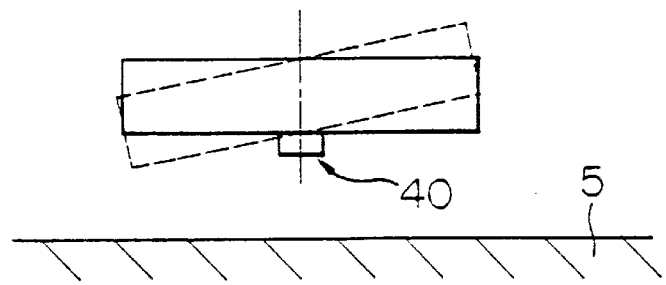
FIG. 6 is an end view for illustrating floating states of the magnetic head slider assembly shown in FIG. 4.

Furthermore, by disposing the core pad projection 40 at the center of the thin film magnetic head 20 as viewed in the direction widthwise of the magnetic head slider assembly (i.e., in the transversal direction of the magnetic head slider assembly), there can be achieved such advantage that even when the magnetic head slider assembly is inclined in such a manner as indicated by a phantom line in FIG. 6 for some reason (e.g. under the effect of acceleration in the seek operation phase), the floating height Hm of the magnetic head core will scarcely vary, as can be seen in FIG. 6. In other words, stable floating of the magnetic head slider assembly can be realized. Thus, there can be implemented a magnetic disk recording/reproducing apparatus of high reliability, avoiding errors in the data read/write operation.

Embodiment 3

Figure 7:
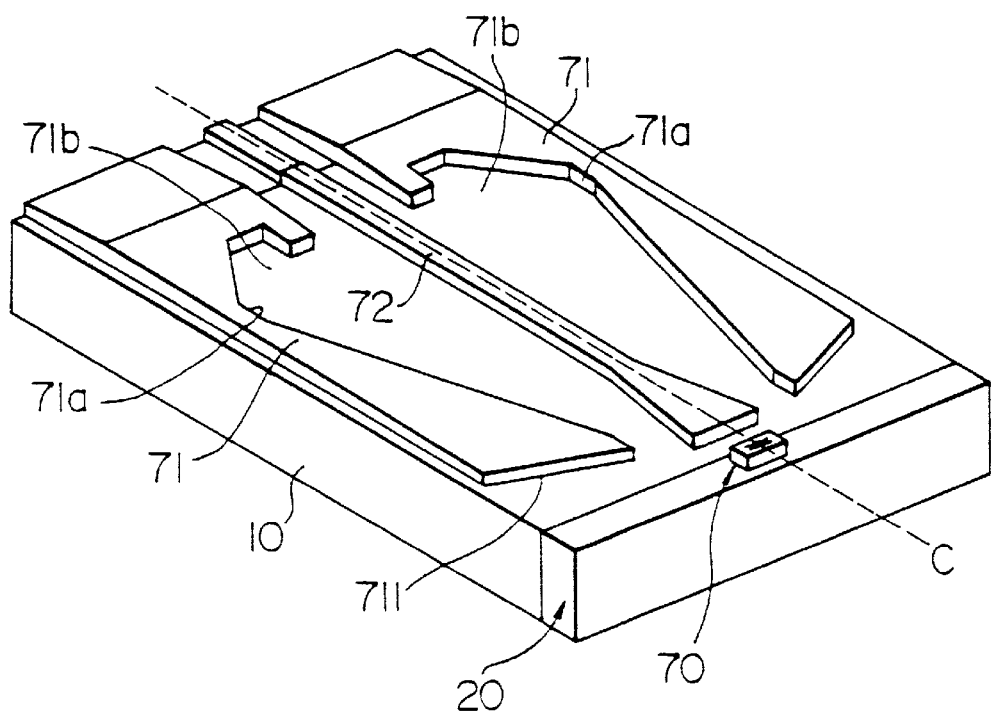
FIG. 7 is a perspective view showing schematically a structure of the magnetic head slider assembly according to a third embodiment of the present invention.

FIG. 7 is a perspective view showing schematically a structure of a magnetic head slider assembly according to a third embodiment of the present invention. In the case of the magnetic head slider assembly according to the instant embodiment of the invention, floating pads 71 and 72 of the slider body 10 are disposed with a predetermined distance from a core pad projection 70 which is disposed at a center of a magnetic head constituted by a thin film layer as viewed in the widthwise direction (i.e., in the transversal direction of the magnetic head slider assembly), similarly to the case of the magnetic head slider assembly according to the second embodiment of the invention described previously. As can be seen in FIG. 7, when a plurality of pads (71; 72) are provided on the slider body, it is sufficient to space the pad (e.g. the center pad or rail 72) positioned closest to the core pad projection 70 by a predetermined distance from the core pad projection 70. Owing to such arrangement, the low floating height of the magnetic head can be realized without undergoing adverse influence of the so-called process offset.

More specifically, in the case of the magnetic head slider assembly shown in FIG. 7, there are provided a pair of floating pads 71 and a center pad 72. Each of the floating pads 71 is implemented in a structure which features the following:

(1) A neck portion or constriction 71a is provided for forming a negative pressure generating pocket on the bleeder surface.

(2) The side of the floating pad 71 located adjacent to the center line C of the magnetic head slider assembly is so inclined that the width of the floating pad 71 decreases progressively as the distance from the end face 711 thereof increases (i.e., in the direction toward the front end of the slider body.

On the other hand, the center pad 72 is implemented in a structure featuring the following:

(1) The center pad 72 has a rear end portion whose width increases progressively as the distance to the core pad projection 70 decreases.

(2) The depth of the negative pressure generating pocket (bleeder depth) is decreased so that it is about 6 μm.

With the structure of the magnetic head slider assembly according to the instant embodiment of the invention, there can be obtained advantageous effects mentioned below. Namely, by making shallower the depth of the negative pressure generating pocket 71b on the order of 6 μm as compared with the depth of the corresponding floating surface of the first embodiment and forming the constrictions 71a in the floating pads 71 so as to form pockets 71b therebetween, it is possible to generate a negative pressure. In this conjunction, with the phrase "negative pressure", it is contemplated to mean a pressure which is lower than the atmospheric pressure and which provides a force for sucking or attracting the magnetic head slider assembly toward the magnetic disk surface.

By virtue of the structure of the magnetic head slider assembly described above, there can be realized a uniform floating height of the magnetic head over the whole range from the inner periphery of the magnetic disk to the outer periphery thereof by canceling out variations in the floating height due to difference in the radial position on the magnetic disk (i.e., in dependence on the circumferential speed and the angle of yaw). More specifically, when the circumferential speed increases as the magnetic head slider assembly displaces radially inwardly, the negative pressure generating pockets 71b generate a negative pressure or vacuum for canceling out an increase of the floating force acting on the floating pad 71. In this way, the constant floating height can be realized over the whole area of the magnetic disk (i.e., at all the radial positions of the magnetic head slider assembly), whereby a constant density recording with a constant linear recording density (bits per inch) can be realized at all the radial positions of the magnetic disk. Furthermore, by providing the constriction 71a in each of the floating pads 71 and shaping the latter such that the width thereof increases progressively toward the end face 711 with an inclination relative to the center line, as mentioned previously, a predetermined or desired floating height can be ensured because the aerodynamic pressure generation efficiency can be protected against degradation regardless of air flow incident obliquely to the floating pads, which may take place during the seek operation. Besides, by providing the center pad 72, the negative pressure can be generated stably even during the seek operation (or upon generation of the yaw angle) because the sucking or attracting forces exerted by the negative pressure generating pockets and generated through cooperation of both the lateral floating pads 71 and the center pad 72 are prevented from interfering with each other owing to the presence of the center pad 72. Finally, it should also be mentioned that by shaping the center pad 72 such that the width thereof increases toward the core pad projection 70, rigidity of an air current layer produced around the magnetic head can be enhanced, whereby the disk tracking or follow-up performance of the magnetic head slider assembly can be improved. Owing to the advantageous features mentioned above, there can be realized a stabilized floating state of the magnetic head slider assembly.

Embodiment 4

Figure 8:
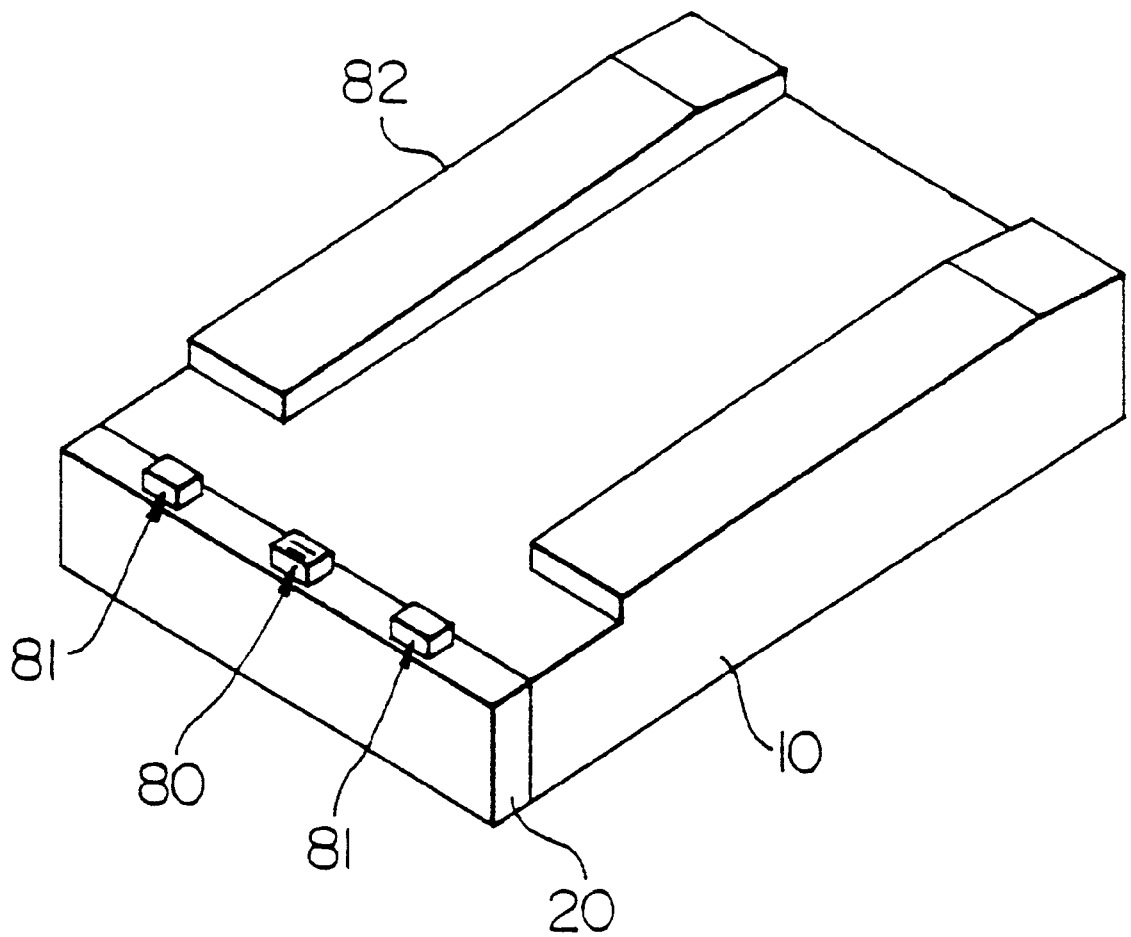
FIG. 8 is a perspective view showing only schematically a structure of the magnetic head slider assembly according to a fourth embodiment of the present invention.

FIG. 8 is a perspective view showing only schematically a magnetic head slider assembly according to a fourth embodiment of the present invention. In the case of the magnetic head slider assembly according to the instant embodiment of the invention, a pair of abrasion-resistive pads 81 each including no core of the magnetic head are provided at both lateral sides of a core pad projection 80 for protecting the latter from abrasion. These abrasion-resistive pads 81 are formed on a thin film layer 20 of the magnetic film similarly to the core pad projection 80 in a same height as the latter. Although it is presumed that the abrasion-resistive pads 81 are each formed in a same rectangular shape with a same size as the core pad projection 80, it should be understood that the abrasion-resistive pad 81 may be formed in different shape and size from those of the core pad projection 80 so long as the former are formed within the region of the thin film magnetic head 20. In the case of the magnetic head slider assembly according to the instant embodiment of the invention, the minimum floating height Hm mentioned hereinbefore in conjunction with the preceding embodiments can be ensured notwithstanding of the provision of the abrasion-resistive pads 81. The magnetic head slider assembly according to the instant embodiment of the invention can find profitable application to a CSS (Contact Start/Stop) type magnetic disk recording/reproducing apparatus in which the magnetic head slider assembly slides continuously on the magnetic disk upon starting of rotation of the magnetic disk and the former is caused to float above the magnetic disk when the rotation speed (rpm) thereof attains a predetermined value. In that case, the abrasion-resistive pads 81 share the contacting force with the core pad projection 80. Owing to this feature, the problem of the core pad projection 80 undergoing abrasion due to the continuous contact with the magnetic disk can successfully be solved. Thus, there is provided according to the instant embodiment of the invention a magnetic head slider assembly having a high reliability.

In the magnetic head slider assembly now under consideration, the core pad projection 80 and the abrasion-resistive pads 81 are formed in a rectangular shape. However, this is never the prerequisite condition. They can be implemented in a triangular shape which may assure dust-proof effect or in a rounded shape which is excellent in respect to the abrasion resistance.

Further, protective films may be deposited on the surfaces of the pads 80, 81 facing the magnetic disk as well as on the floating surface of the floating pads 82 with a view to improving the abrasion resistance characteristics of these pads. As a protective film, there may be mentioned a carbon (C) film, a silicon (Si) film, a silicon oxide (SiO$_2$) film or the like. The protective film may be provided in a single layer or alternatively in the form of stacked layers to thereby constitute a multi-layer film for realizing a magnetic head slider assembly capable of exhibiting excellent abrasion-resistive property and high operation reliability.

Embodiment 5

Figure 9:
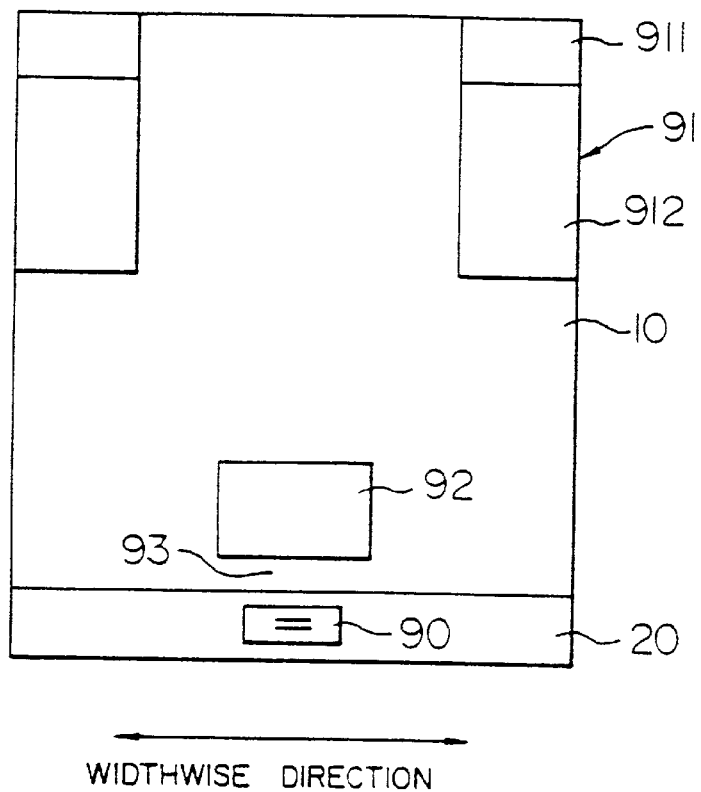
FIG. 9 is a plan view showing a structure of the magnetic head slider assembly according to a fifth embodiment of the present invention.

FIG. 9 is a plan view showing a structure of a magnetic head slider assembly according to a fifth embodiment of the present invention, as viewed in the direction facing a magnetic disk. In the case of the magnetic head slider assembly according to the instant embodiment of the invention, a center pad 92 is provided at a center position as viewed in the direction widthwise of the thin film magnetic head 20 and closer to a core pad projection 90 than floating pads 91. In this conjunction, it is to be mentioned that by providing the center pad 92 in addition to the pads 91 and 92 on the slider body 10 closest to the core pad projection 90 with a predetermined distance therefrom so that a space 93 intervenes between the core pad projection 90 and the center pad 92, the influence of the so-called process offset can essentially be nullified.

The magnetic head slider assembly according to the instant embodiment of the invention is advantageous in the respects mentioned below.

(1) The rigidity of the air current layer produced around the magnetic head upon read/write operation can be enhanced, whereby the disk tracking or follow-up capability of the magnetic head can be improved.

(2) When the magnetic head slider assembly is brought into contact with the magnetic disk for some reason, damage which the core pad projection 90 may undergo can positively be mitigated. Thus, the reliability of the magnetic head slider assembly can significantly be enhanced.

Embodiment 6

Figure 10:
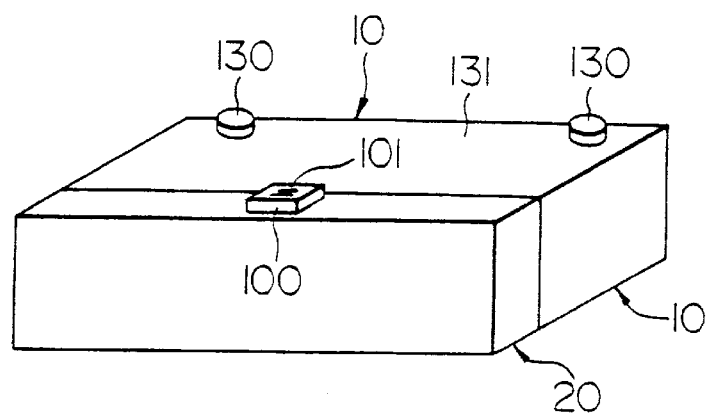
FIG. 10 is a perspective view showing a structure of the magnetic head slider assembly according to a sixth embodiment of the present invention.
Figure 11:
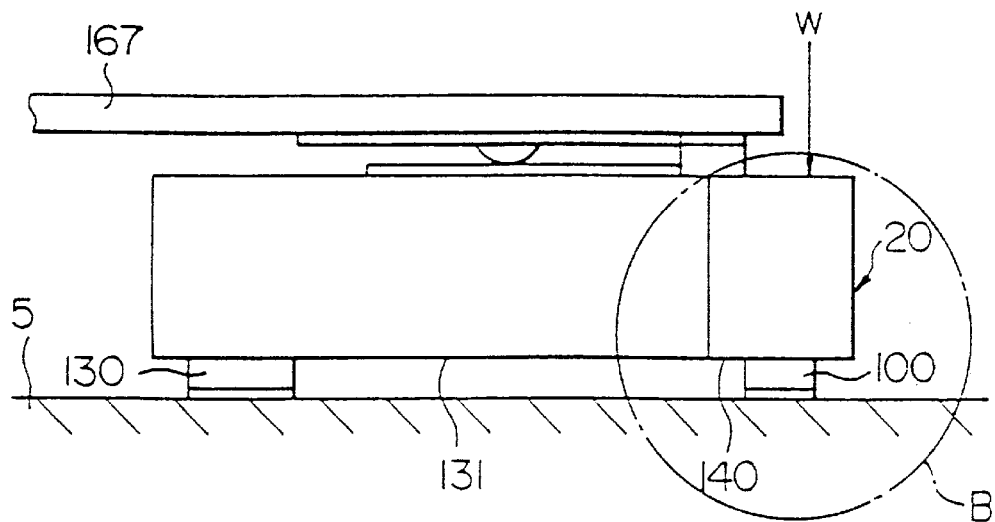
FIG. 11 is a schematic side elevational view of the sixth embodiment.

FIG. 10 is a perspective view showing a magnetic head slider assembly according to a sixth embodiment of the present invention, and FIG. 11 is a schematic side elevational view of the same mounted to a thin plate lever or arm 167. The magnetic head slider assembly according to the instant embodiment of the invention is so designed as to realize a contact recording/reproducing operation.

Provided on the bleeder surface 131 of the slider body 10 which faces the magnetic disk are sliding projections 130 each in the form of a circular column having a height Hr of about 30 μm and a diameter Ds of about 30 μm. By selecting the height Hr of each of the sliding projections 130 to be at least 10 μm, the influence of air currents generated in accompanying the rotation of the magnetic disk 5 can be obviated. Furthermore, in case the height Hr of each of the sliding projections 130 is selected to be greater than 20 μm inclusive, the influence of the air currents can substantially be nullified. To say in another way, it is possible to prevent generation of a floating force on the bleeder surface 131 of the slider body 10 by the air current. Further, by selecting the diameter Ds of each of the sliding projections 130 to be about 30 μm, the floating force generated by the sliding projections 130 can substantially be nullified. In this manner, the slider body 10 can be made immune to the influence of the air current generated in accompanying the rotation of the magnetic disk, which in turn means that the slider body 10 can be placed to a stable contact with the magnetic disk surface. Furthermore, by implementing the sliding projection 130 in the form of a circular column presenting no edge, damage such as abrasion which the magnetic head may suffer because of contact with the magnetic disk can be mitigated. This advantageous effect is very important particularly for the seek operation (i.e., operation for moving the magnetic head slider assembly radially relative to the magnetic disk). Such effect can not be expected when the sliding projection 130 is formed in the form of a quadrangular prism which presents edges.

Further formed integrally with the thin film magnetic head 20 is a core pad projection 100. Thus, the three projections 100 and 130 in total are brought into stable contact with the surface of the magnetic disk 5. Because a pressing-down or hold-down force W is imparted to the magnetic head slider assembly 1, the core pad projection 100 can stably be maintained in the state contacting with the magnetic disk 5 even when a floating force is generated at the sliding projections 130 and the core pad projection 100 or even when the magnetic head slider assembly tends to move away from the magnetic disk surface for some other reason. In this way, the magnetic head slider assembly according to the instant embodiment of the invention can equally enjoy a high reliability without incurring error in the write/read (recording/reproducing) operation.

For the reasons mentioned above, the core pad projection 100 and the magnetic disk can be placed to a stable and slidable contacting state even when the heights Hh and Hr of the core pad projection 100 and the sliding projection 130, respectively, differ from each other due to the so-called process offset.

Figure 12:
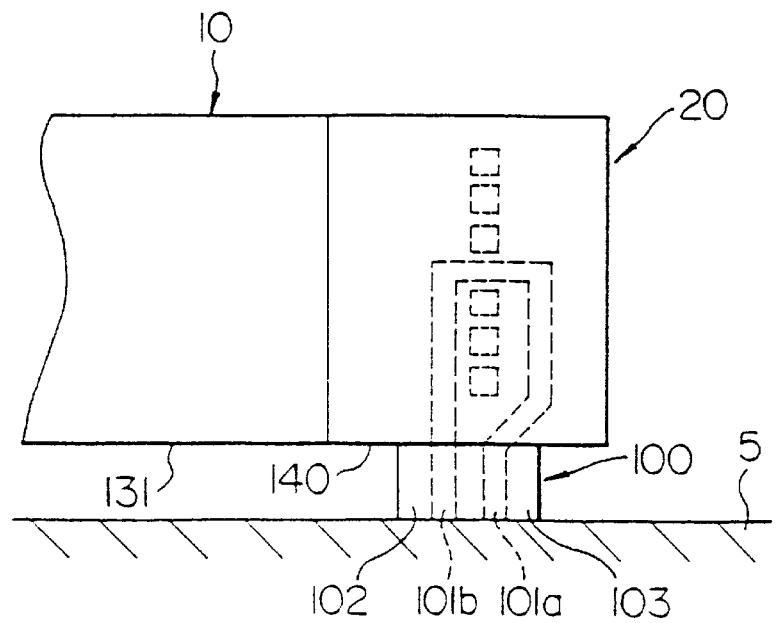
FIG. 12 is a partially enlarged view of FIG. 11 and shows a portion of the magnetic head slider assembly as enclosed by a circle.
Figure 13:
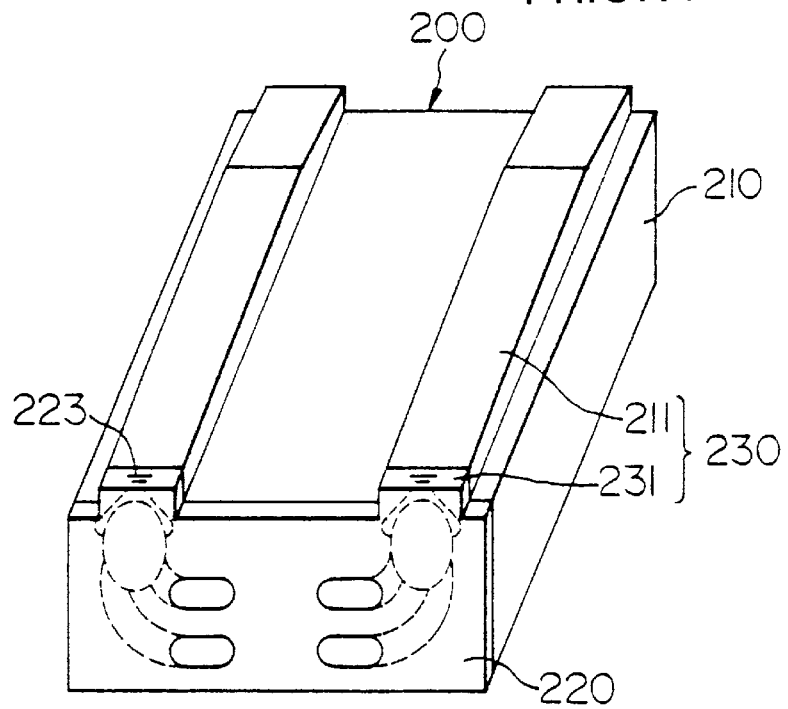
FIG. 13 is a perspective view showing a structure of a prior art magnetic head slider assembly.
Figure 14:
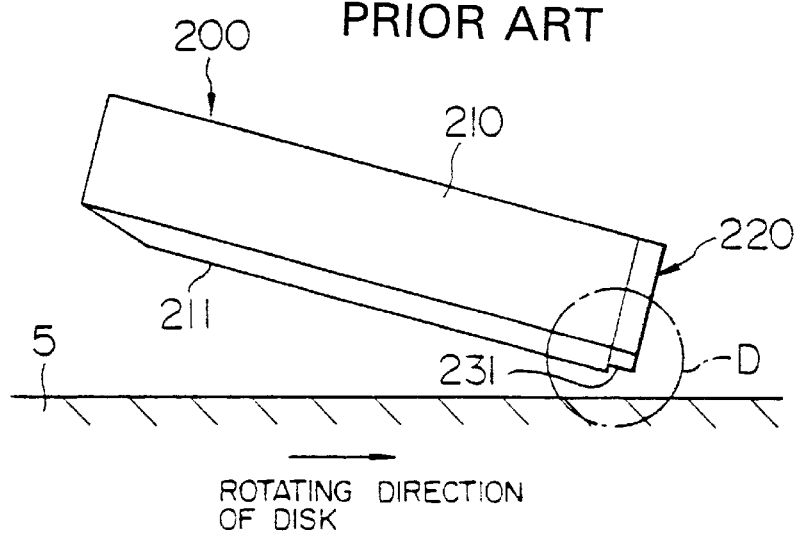
FIG. 14 is a view for illustrating conceptually a floating state of the prior art magnetic head slider assembly of FIG. 13.
Figure 15:
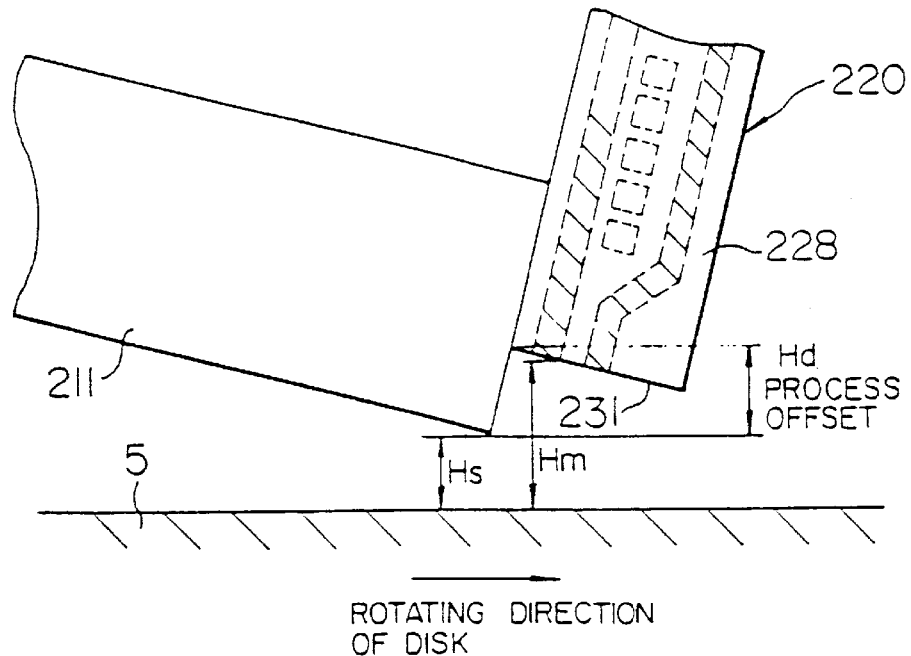
FIG. 15 is an fragmentary enlarged view showing a portion of the prior art magnetic head slider assembly indicated as encircled in FIG. 14.

FIG. 12 is a partially enlarged view of FIG. 11 showing a portion enclosed by a circle. The core pad projection 100 is constituted solely by a thin film which constitutes the thin film magnetic head 20, as in the case of the preceding embodiments of the invention. To say in another way, the core pad projection 100 includes no part of the slider body 10 but is provided independently from the latter. More specifically, the core pad projection 100 is comprised of a substrate layer 102, an upper core element 101a, and a lower core element 101b and a protective film 103. For fabricating the core pad projection 100, materials of the substrate layer 102 and the protective film 103 are removed away to such extent that the magnetic core elements 101a and 101b are not exposed thereby but remain sandwiched or covered between the substrate layer 102 and the protective film 103, because, if otherwise, corrosion may occur in the magnetic core 101.

Furthermore, by depositing a protective film (not shown) on the sliding projections 130 as in the case of the core pad projection 100, the sliding performance of the magnetic head slider assembly as a whole and hence the operation reliability thereof can be enhanced. To this end, a carbon (C) film, a silicon (Si) film, a silicon oxide ($SiO_2$) film or the like may be employed as the protective film.

As is apparent from the above description, in the case of the magnetic head slider assembly 1 according to the instant embodiment of the invention, there are provided on the slider body 10 of the magnetic head slider assembly 1 a pair of sliding projections 130 which are adapted to slidably move on and along the magnetic disk surface in combination with a single core pad projection 100 formed in the thin film layer of the thin film magnetic head 20, wherein the core pad projection 100 is formed only of the thin film which constitutes the thin film magnetic head 20 so as to have a projection height which is substantially equal to that of the sliding projections 130. By virtue of this structure, the magnetic core 101 of the thin film magnetic head 20 can be placed in the state contacting slidably and stably with the magnetic disk 5, which contributes advantageously to realization of an increased linear recording density. Besides, reliability of contact write/read operation of the magnetic head slider assembly can equally be improved because there can positively be excluded occurrence of error due to separation between the magnetic core 101 and the magnetic disk 5 for some reasons.

Embodiment 7

Figure 17:
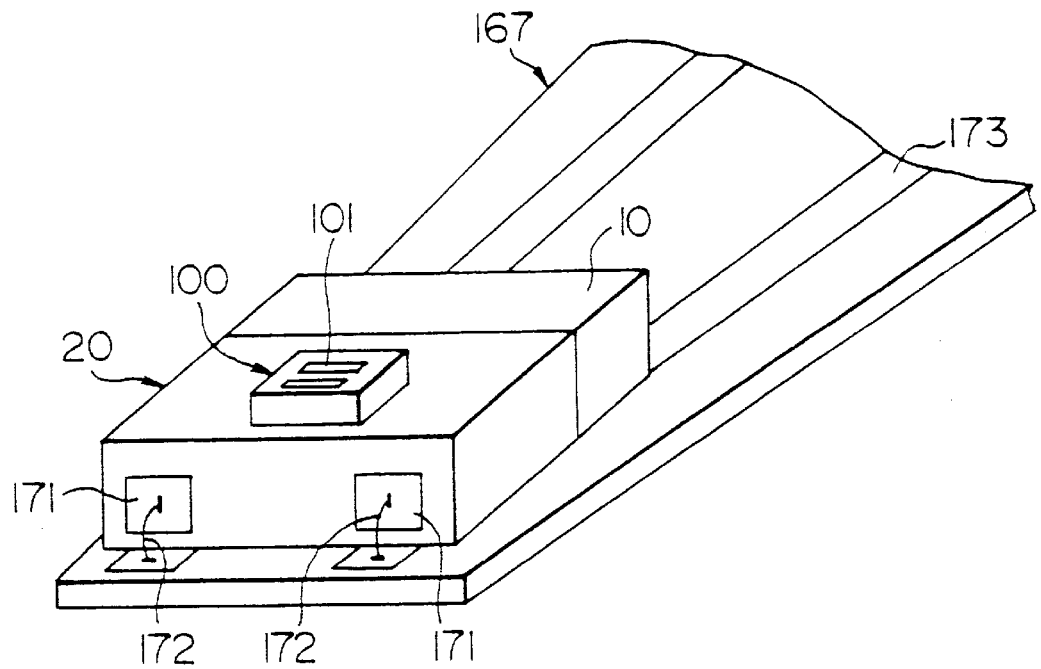
FIG. 17 is a perspective view showing a structure of the magnetic head slider assembly according to a seventh embodiment of the invention.
Figure 18:
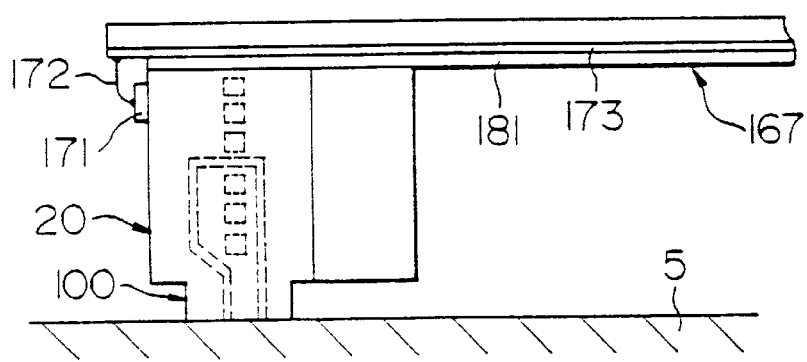
FIG. 18 is a side elevational view showing the seventh embodiment together with a magnetic disk.

A seventh embodiment of the present invention will be described by reference to FIGS. 17 and 18, in which FIG. 17 is a perspective view showing a magnetic head slider assembly according to the instant embodiment of the invention and FIG. 18 is a side elevational view showing the same together with a magnetic disk. In the case of the magnetic head slider assembly now of concern, only one core pad projection 100 is formed on the thin film magnetic head 20, while the other floating pads or sliding projections mounted on the slider body 10 of the magnetic head slider assembly as described hereinbefore in conjunction with the preceding embodiments of the invention are all spared. The magnetic head slider assembly according to the instant embodiment of the invention is mounted on a thin-plate lever or arm 167 made of a sheet material or thin plate having a triangular cross-section.

A feature of the magnetic head slider assembly under consideration can be seen in that the number of contact points between the magnetic head slider assembly and the magnetic disk (i.e., total number of the projections of the magnetic head core slider assembly) is decreased from three to one and thus the whole structure of the magnetic head slider assembly can be implemented in a correspondingly reduced size and a light weight. This structure is advantageous in that the damage which the magnetic disk may possibly suffer upon siding contact with the magnetic head slider assembly can be mitigated. Besides, the tracking or follow-up characteristic of the magnetic head slider assembly is improved, whereby a stable contact can be ensured between the magnetic disk and the head slider assembly even when the magnetic disk is subjected to vibration. Besides, by limiting the contact point only to the core pad projection 100, tracking of the magnetic disk can be accomplished with high accuracy regardless of undulation (or roughness) of the magnetic disk surface.

The lever (arm) used for this kind of application is usually provided with a pivot and a gimbals. By contrast, with the thin-plate lever of a triangular shape employed in the magnetic head slider assembly according to the instant embodiment of the invention, neither the pivot nor the gimbals is required. More specifically, provided on a surface of the lever 167 on which the slider is to be mounted is a printed wiring 173 coated with an insulation film 181, wherein a terminal end of the printed wiring 173 is connected to a core pad 171 of the thin film magnetic head by way of copper wires 172. Because the printed wiring 173 is coated with the insulation film 181, the slider may be directly bonded to the lever 167 by using a suitable adhesive or a bonding agent. In that case, the magnetic head supporting means can be realized in a thin structure, which leads profitably to implementation of the magnetic head/slider assembly in a thin structure as a whole.

As is apparent from the above description, there is provided according to the instant embodiment of the invention a magnetic head slider assembly which ensures a high reliability and which is profitably suited for use in a magnetic disk recording/reproducing apparatus of a small size and a thin structure. Of course, the core pad projection can be formed only by the thin film constituting the thin film magnetic head 20. Besides, no process offset makes appearance between the thin film magnetic head and the slider body because of absence of any projections on the slider body. Thus, a stable sliding contact can be realized between the magnetic disk and the magnetic head slider assembly.

Embodiment 8

Figure 19:
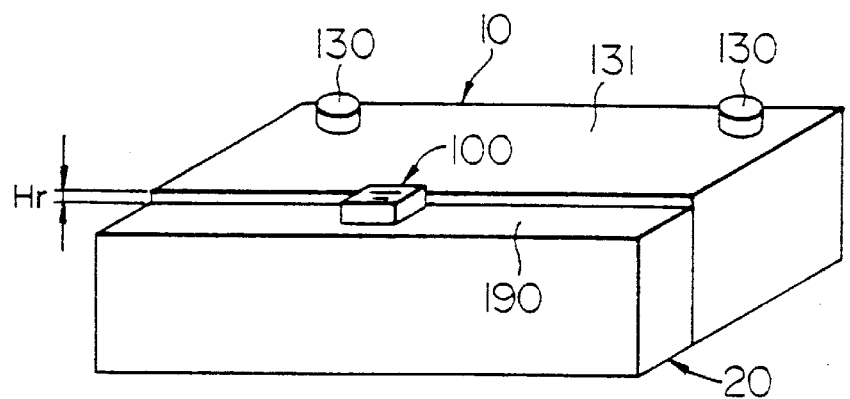
FIG. 19 is a perspective view showing a structure of the magnetic head slider assembly according to an eighth embodiment of the present invention.

FIG. 19 shows in a perspective view a magnetic head slider assembly according to an eighth embodiment of the present invention. The magnetic head slider assembly according to the instant embodiment of the invention differs from that of the sixth embodiment (FIG. 10) in that a step 190 is provided in the surface of the thin film magnetic head 20 which faces a magnetic disk. Except for this difference, the structure of the magnetic head slider assembly according to the instant embodiment is substantially identical with that of the sixth embodiment (FIG. 10). The magnetic disk is rotated in the direction extending from the slider body 10 to the thin film magnetic head 20. Accordingly, the air current generated in accompanying the rotation of the magnetic disk flows through an air passage defined between the magnetic disk and a disk facing surface 131 of the slider body 10 to be thereby directed toward the step or offset portion 190. Because the cross-sectional area of the air flow passage is enlarged by providing the step or offset portion 190, there prevails a negative pressure at this step or offset area 190. The height Hr of the step or offset portion 190 is about 5 $\mu$m. In this conjunction, it should be mentioned that the height Hr of the offset area 190 should be selected smaller than ca. 18 $\mu$m because, if otherwise, the negative pressure may possibly rise up steeply. As mentioned previously, the phrase "negative pressure" means a pressure lower than the atmospheric pressure and exerts a force for pressing down the magnetic head 20 toward the magnetic disk surface. Consequently, even if the magnetic disk vibrates in the course of rotation or even if an external force is applied which tends to move the core pad projection 100 away from the magnetic disk surface for some reason, the core pad projection 100 can nevertheless be maintained in the state contacting stably with the magnetic disk surface. Thus, there is provided according to the eighth embodiment of the invention a magnetic head slider assembly which can enjoy high reliability without incurring no error in the read/write operation.

At this juncture, it should be mentioned that the negative pressure Fn increases as the offset height Hr decreases so long as the latter is smaller than about 15 $\mu$m (i.e., Hr$\leq$ca. 15 $\mu$m). Accordingly, the height Hr should preferably be so selected that a contact surface pressure P (where P=pressing-down force W+negative pressure Fn/contacting surface area S) is lower than 200 kPa from the viewpoint of securing the reliability. It should further be added that in the case of the magnetic head slider assembly according to the instant embodiment of the invention, the negative pressure becomes zero in the state where the magnetic disk is stationary even when the contact surface pressure P during rotation of the magnetic disk remains constant at a same value during rotation of the magnetic disk. Thus, the contact surface pressure can be reduced when compared with the magnetic head slider assembly where the negative pressure is not made use of.

The step or offset area 190 may be formed by machining. The sliding projection 130 and the core pad projection (gap defining projection) 100 may be formed by ion milling, etching or the like process. In that case, the step or offset area 190 may be realized by taking advantage of difference in the milling rate (etching rate) due to difference in material between the slider body 10 and the thin film magnetic head 20. In general, alumina used for forming the substrate and the protective film of the thin film magnetic head 20 can be milled or etched at a higher rate when compared with the milling rate (or etching rate) for alumina titanium carbide or zirconia used for forming the slider body 10. Accordingly, when both the slider body 10 and the thin film magnetic head 20 are simultaneously milled, there results an offset (step) between the slider body 10 and the thin film magnetic head 20 due to difference in the milling rate therebetween. Thus, it will readily be understood that the step or offset area 190 can be formed by taking advantage of difference in the milling rate (etching rate) between the slider body 10 and the thin film magnetic head 20.

Embodiment 9

A ninth embodiment of the present invention is directed to a method of manufacturing the magnetic head slider assembly described above, which will be described below by reference to FIGS. 20 to 25.

Figure 20:
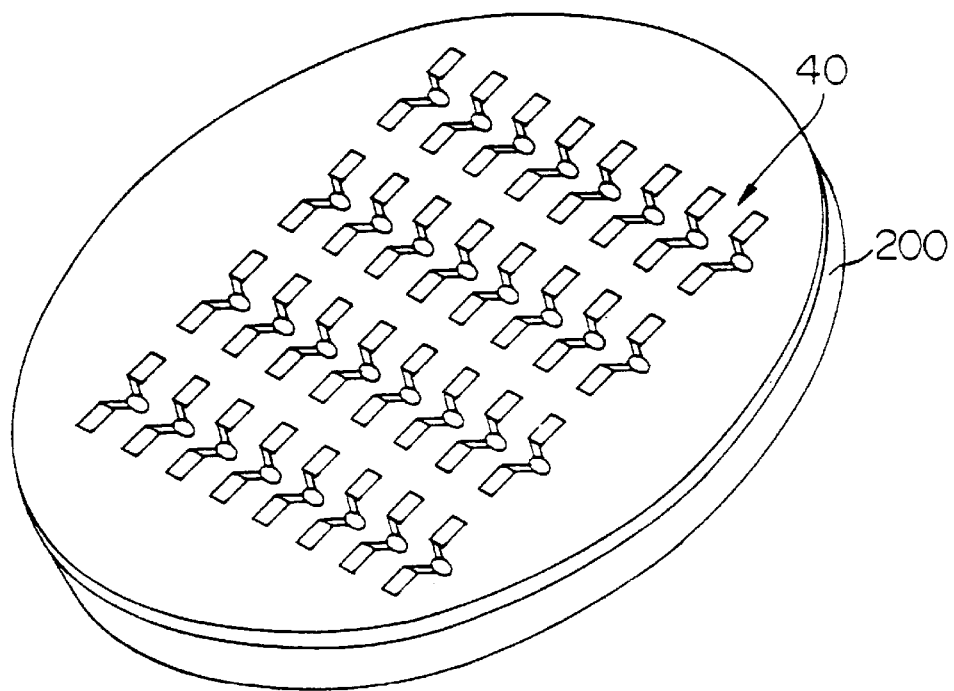
FIG. 20 is a perspective view showing an array of thin film magnetic heads formed on a wafer through a manufacturing method according to a ninth embodiment of the present invention.

As shown in FIG. 20, a plurality of thin film magnetic heads 40 is formed in plural rows and columns on a ceramics substrate (wafer) 200 made of, e.g. alumina titanium carbide (AlTiC) or zirconia (ZrO$_2$) by a sputtering or the like process. The thin-film magnetic head 40 may be formed by resorting to a process similar to the conventional IC (integrated circuit) manufacturing process and is composed of a lower magnetic film, a gap defining film, an upper magnetic film, a coil film, an inter-phase insulation film, a protective film and others.

Figure 21:
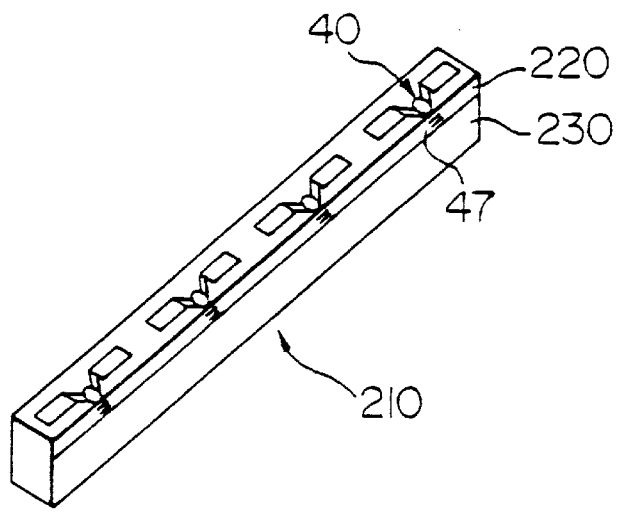
FIG. 21 is a view showing a block of thin film magnetic heads resulting from segmentation of the array shown in FIG. 20 into elongated blocks.
Figure 22:
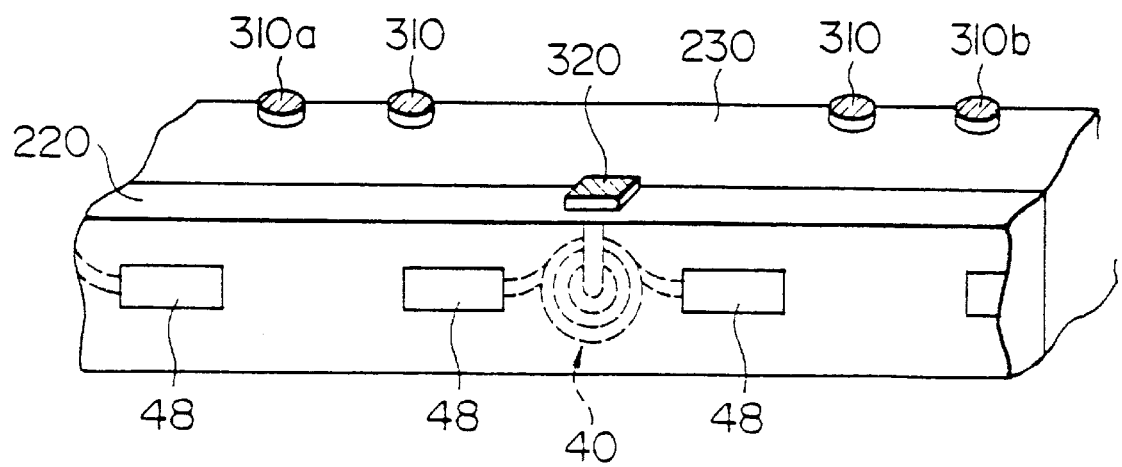
FIG. 22 is a perspective view for illustrating an etching process adopted in the magnetic head slider assembly manufacturing method.

The wafer 200 having the thin film magnetic heads 40 formed thereon is segmented into elongated blocks 210, as is shown in FIG. 21. In this conjunction, it is to be noted that four magnetic head slider assemblies are formed in one row, wherein a wafer portion 230 of the block 210 constitutes the slider body while the thin film 220 constitutes the magnetic head. Further, the cut surface of the thin film layer in which magnetic gap 47 is formed is destined to serve as the contact face for the magnetic disk, while the cut surfaces of the wafer lying in a same plane as the above-mentioned contact surface serves to constitute the projecting contact surfaces 320 and 310, respectively (see FIG. 22). The contact surface 320 of the thin film magnetic head and the contact surface 310 of the slider body 230 are polished by lapping or the like process until a predetermined surface roughness as well as a predetermined gap depth is obtained with a view to smoothing the contact surfaces mentioned above to such extent that a satisfactory contact with the magnetic disk surface can be obtained as well as for the purpose of adjusting the gap depth.

At this juncture, it is to be mentioned that because the thin film layer 220 constituting the thin film magnetic head has a smaller hardness (i.e., softer) when compared with the ceramic wafer constituting the slider body 230, there results a so-called process offset between the contact surface 310 of the slider body 230 and the contact surface 320 of the thin film magnetic head 220 in such a manner that the contact surface 320 of the thin film magnetic head 220 is retracted relative to the contact surface 310 of the slider body.

Figure 24:
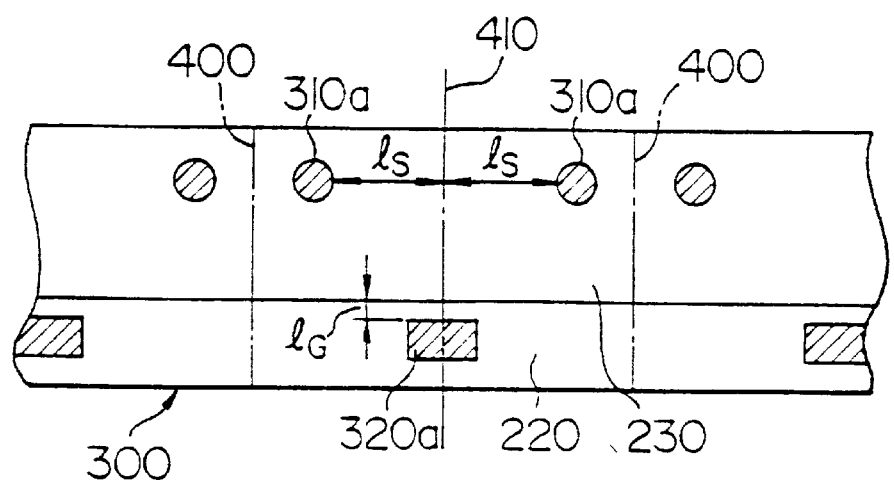
FIG. 24 is a plan view of a mask employed in the etching process.
Figure 25:
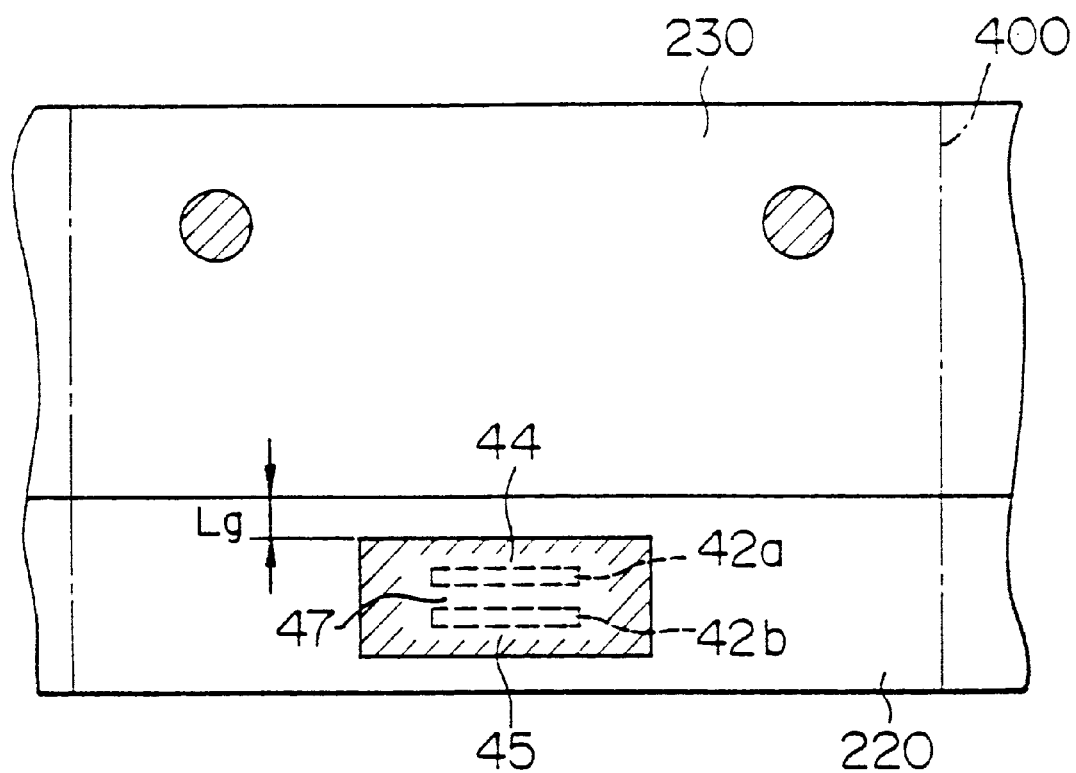
FIG. 25 is an enlarged plan view of the mask shown in FIG. 24.

For forming the sliding projections 310 and the core pad projection (or gap defining projection) 320, a mask 300 such as shown in FIG. 24 is prepared. As the mask 300, there can be used a resist mask which is conventionally employed in IC (integrated circuit) manufacturing processes. The mask 300 is provided with mask patterns 310a and 320a corresponding to the shapes of the sliding projections 310 and the core pad projection (or gap defining projection) 320, respectively. More specifically, each of the mask patterns for the sliding projections has a circular form having a diameter of about 300 $\mu$m which is equal to that of the slider projection 310 to be formed in the slider body 230. Similarly, the mask pattern 320a for the core pad projection 320 has a rectangular form of a size of 400 $\mu$m×20 $\mu$m which is substantially same as the core pad projection 320 to be formed in the thin film constituting the thin film magnetic head. The mask for the core pad projection is so prepared as to cover the core or gap, the upper and lower magnetic films, the substrate and a portion of the protective film and provided only for the contact surface of the magnetic head.

As can be seen in FIG. 24, the mask 320a for the core pad projection is provided on the contact surface 220 of the thin film magnetic head and positioned on a center line 410 between the paired masks 310a for the sliding pad projections 310 with a predetermined distance Lg from the contact surface 230 of the slider body. The mask pattern 320a is provided in a region including the substrate film 44, a lower magnetic film 42a, the gap film 47, the upper magnetic film 42b and the protective film so as to encircle the lower magnetic film 42a, the gap film 47 and the upper magnetic film 42b.

Subsequently, an etching process is carried out by using the mask 300 mentioned above to thereby remove away the materials of those regions which are not covered with the mask. In the manufacturing method according to the instant embodiment of the present invention, the etching is carried out by using argon (Ar) ions. It is however apparent that other ions may be employed to this end. After removal of the materials from the regions which are not covered with the mask, those portion covered with the masks remain as they are, to thereby form projection.

Figure 23:
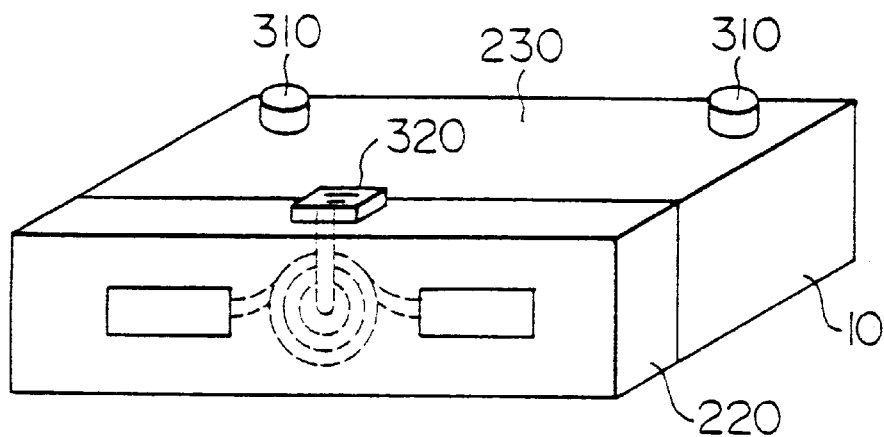
FIG. 23 is a perspective view showing a magnetic head slider assembly including a magnetic head as manufactured by the method according to the ninth embodiment.

After the etching process, the masks are delaminated, and then the product is cut along a boundary line 400, whereby one magnetic head slider assembly shown in FIG. 23 can be obtained.

Although the etching process is adopted as a method of forming the slider projections and the core pad projection, it goes without saying that a machining process may equally be employed in place of the etching process. Namely, materials exposed through the mask patterns may be removed by using a grinder or the like machining tool. Although the machining process is advantageous in that the manufacturing cost is low, it is not suited for finishing a product of complicated and precise geometries such as a curvilinear surface. By contrast, the etching process is suited to a high-precision finishing of a product of a complicated shape. However, the etching rate is relatively low, taking a lot of time for the processing. By way of example, the etching rate lies generally within a range of several microns to several ten microns per hour. Thus, the etching process is not suited for removing a large amount of material. Such being the circumstances, the optimal processing method should be selected by taking into account the shapes of the sliding pad projections and the core pad projection. Of course, the floating pad mentioned hereinbefore may be formed through the process described above.

As will now be appreciated from the foregoing description, according to the teachings of the invention, the so-called process offset effect can virtually be eliminated between the slider body and the magnetic head core portion. By virtue of this feature, a low floating height of the magnetic head can be realized. Alternatively, the magnetic head and the magnetic disk can be brought into stable contact with each, which contributes to realization of a high recording density without incurring error in the write/read operation of the magnetic head.

Many modifications and variations of the present invention are possible in the light of the above techniques. It is therefore to be understood that the invention may be practiced otherwise than as specifically described without departing from the spirit and scope of the invention.

We claim:

1. A magnetic head slider assembly comprising:

a slider body;

a thin film layer disposed at one end of said slider body;

a magnetic head constituted by said thin film layer; and a core pad projection provided on said thin film layer, which said magnetic head is incorporated in, and wherein said core pad projection constitutes no part of said slider body and is so formed as to project towards a magnetic disk beyond an adjacent disk facing surface of said slider body immediately in front of said core pad projection;

a sliding pad provided at a region of said slider body ahead of said core pad projection for preventing generation of a floating force by making use of a relative movement between said slider body and said magnetic disk, said sliding pad being so formed as to project beyond the disk facing surface of said region of said slider body; and wherein said core pad projection and said sliding pad are separated from each other a predetermined distance longitudinally of said slider body by a recess interposed therebetween whereby the core Dad projection and the magnetic disk are placed to a stable and slidable contacting state even though said back end of said sliding Dad projects from said disk facing surface of said slider body by a distance which is longer than a distance by which said back end of said core pad projection projects from said disk facing surface of said slider body.

2. A magnetic head slider assembly according to claim 1 wherein a pair of spaced sliding pads are provided at a region of said slider body ahead of said core pad projection and said core pad projection is disposed substantially at a center line between said pair of sliding pads.

3. A magnetic head slider assembly comprising:

a slider body;

a thin film layer disposed at one end of said slider body;

a magnetic head constituted by said thin film layer; and a core pad projection provided on said thin film layer, which said magnetic head is incorporated in, and wherein said core pad projection constitutes no part of said slider body and is so formed as to project towards a magnetic disk beyond an adjacent disk facing surface of said slider body immediately in front of said core pad projection;

a sliding pad provided at a region of said slider body ahead of said core pad projection for preventing generation of a floating force by making use of a relative movement between said slider body and said magnetic disk, said sliding pad being so formed as to project beyond the disk facing surface of said region of said slider body, and having a height projecting beyond the disk facing surface of said slider body which is greater than a height said core pad projection projects beyond the disk facing surface of said slider body; and wherein said core pad projection and said sliding pad are separated from each other a predetermined distance longitudinally of said slider body by a recess interposed therebetween whereby the core pad projection and the magnetic disk are placed to a stable and slidable contacting state even though said back end of said sliding pad projects from said disk facing surface of said slider body by a distance which is longer than a distance by which said back end of said core Dad projection projects from said disk facing surface of said slider body.

4. A magnetic head slider assembly according to claim 3 wherein a pair of spaced sliding pads are provided at a region of said slider body ahead of said core pad projection and said core pad projection is disposed substantially at a center line between said pair of sliding pads.

* * * * *